Patented June 7, 1932

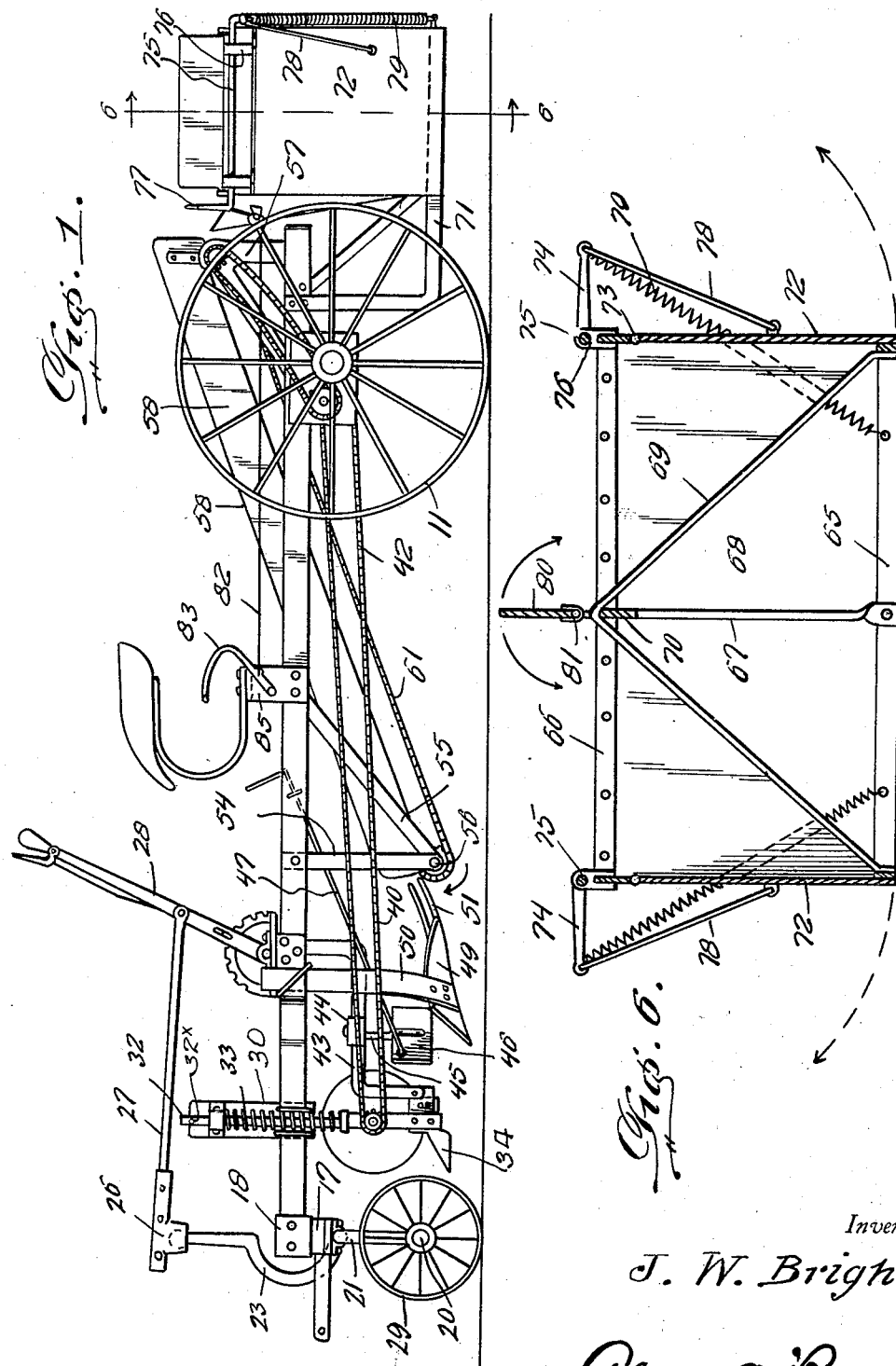

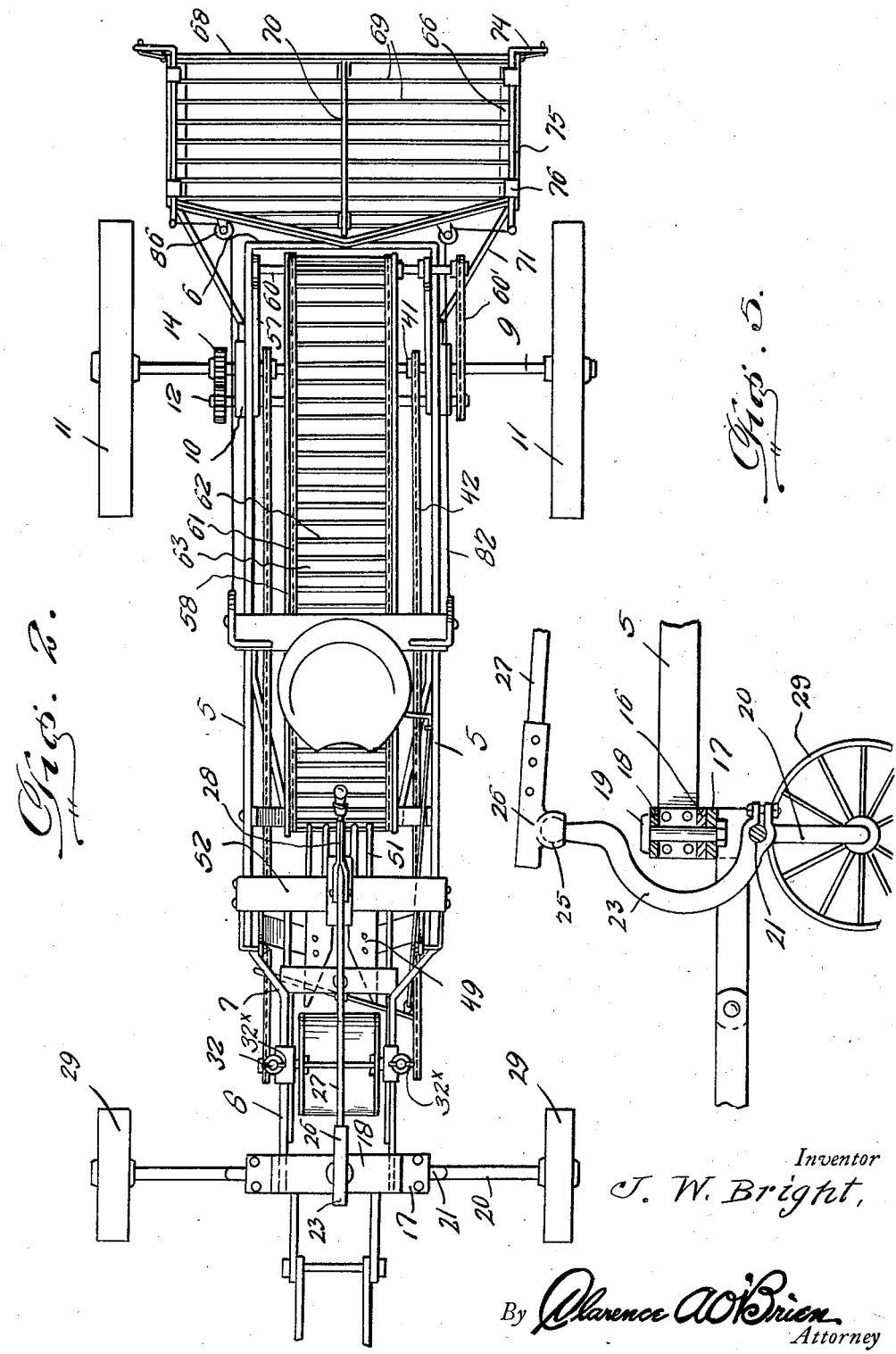

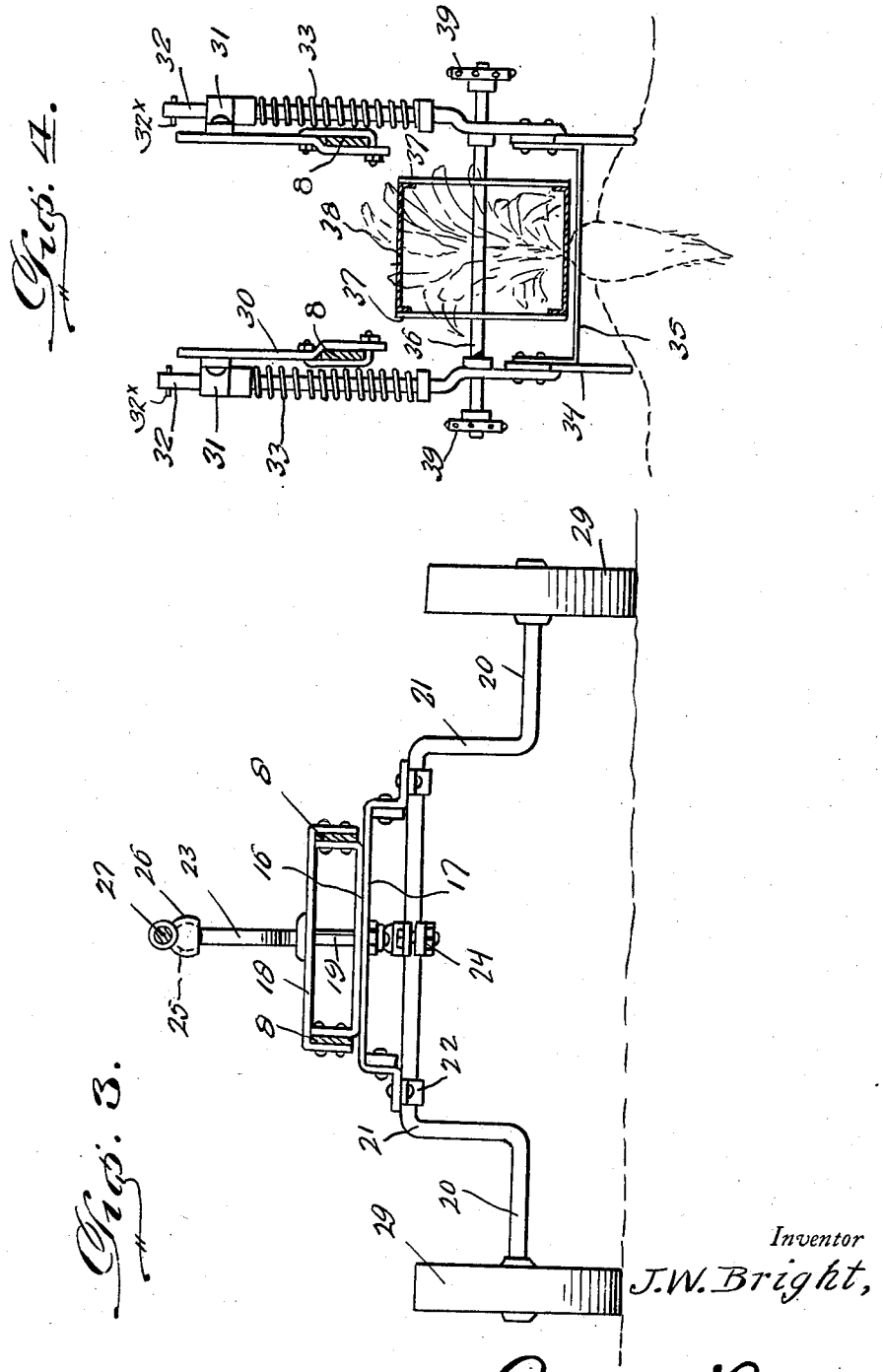

1,862,048

UNITED STATES PATENT OFFICE

JOHN W. BRIGHT, OF GRAND JUNCTION, COLORADO, ASSIGNOR TO THE COLORADO BEET HARVESTER COMPANY, A CORPORATION OF COLORADO

BEET HARVESTER AND TOPPING MACHINE

Application filed March 23, 1928. Serial No. 264,239.

The present invention relates to a beet harvester and topping machine and has for its prime object to provide in combination a wheeled frame, with topping means suspended therefrom, and digging means for lifting the beets from the ground onto an elevator, which deposits the beets in a receptacle at the rear of the wheeled frame.

Another very important object of the invention is in the provision of an apparatus of this nature having a bar knife attached to slipper plows and a topper wheel for engaging the tops of beets so that they may be severed by the knife, and means for deflecting the severed tops to one side of the travel of the apparatus.

Another very important object of the intion resides in the provision of a beet harvester and topper mounted on a wheeled frame, which may be adjusted in respect to the ground in a convenient and easy manner.

Another very important object of the invention resides in the provision of a receptacle into which the beets are delivered and from which they may be dumped in piles to both sides of the machine.

A still further very important object of the invention resides in the provision of a machine of this nature, which has its parts arranged in a compact manner, is thoroughly efficient and reliable in its operation, easy to manipulate, not likely to easily become out of order, and otherwise well adapted to the purpose for which it is designed.

With the above and numerous other objects in view, as will appear as the description proceeds, the invention resides in certain novel features of construction, and in the combination and arrangement of parts as will be hereinafter more fully described and claimed.

In the drawings:

Figure 1 is a side elevation of a machine embodying the features of my invention.

Figure 2 is a top plan view thereof.

Figure 3 is a vertical transverse section.

Figure 4 is a detail view of the topper mechanism showing the same in section.

Figure 5 is a vertical longitudinal section through the mechanism illustrated in Figure 3, and Figure 6 is a vertical transverse section taken substantially on the line 6—6 of Figure 1.

Referring to the drawings in detail, it will be seen that the frame comprises a pair of side bars, 5, connected at their rear ends by a cross bar 6, and having their forward portions bent inwardly as at 7 and terminating in spaced parallel front extensions 8. An axle shaft 9 is journaled in bracket plates 10, on the rear portions of the side bars 5 to be disposed below the frame transversely thereof, and wheels 11 are fixed to the outer ends of the axle shafts. A counter shaft 12 is driven from the axle shaft 9, by means of gearing 14. The numeral 16 denotes an upper member and the numeral 17 a member below the member 16. The ends of the member 16 are secured to the extremities of the extension 8 and a cross member or brace 18 also extends therebetween. A T-pin 19 extends through the brace 18 and through the members 16 and 17. The members 16 and 17 constitute a fifth wheel. An axle 20 has an intermediate crank portion 21 to which the fifth wheel member 17 is secured by clamps 22. An arm 23 has its lower end clamped as at 24 on the center of the crank portion 21 and curves upwardly and forwardly around the members 16 and 17 terminating in a ball 25, above the T-pin 19, and a socket 26 is disposed about the ball and secured to a rod or link 27, which extends rearwardly and is pivotally engaged with the intermediate portion of the lever 28. Obviously, by rocking the lever 28, the crank portion 21 of the axle 20 will rock, so as to raise and lower the frame, said axle section having wheels 29 journaled on the ends thereof.

A pair of brackets 30 are clamped to the side bars 5 and extend upwardly therefrom and having supported on their upper portions bearings 31 for slidably receiving shanks 32, which are urged downwardly by springs 33. On the lower ends of these shanks there are mounted slippers or slipper plows 34, between which extends a horizontal bar knife 35. A shaft 36 is journaled between the shanks 32 above the knife 35 and has a topper wheel thereon which includes side discs 37 and cylinder 38. Sprockets 39 are fixed on the ends of the shaft 36 and have chains 40—42 trained thereover, which are also trained over sprockets 41, on the axle shaft 9. Braces 43 extend upwardly and then rearwardly from the slipper plows and support a cross member 44, in which is rockable a vertical shank 45, with a deflecting wing 46 thereon, which is controlled manually by an adjusting rod 47. Puller plows 49 are supported by means of bars 50, depending from the bars 5, immediately to the rear of the extensions 7 and have leading rearwardly therefrom upwardly and rearwardly inclined rods 51. The shanks 32 are provided with stop pins 32x, Figures 1 and 4. Manifestly when the springs 33 extend downwardly the pins 32x contact with the top of the bearings 31 and in that way stop any further downward movement of the shanks 32 and the attaching topping mechanism. Thus the shanks 32 are prevented from being detached from the bearings 31 and damage is averted. The springs 33 permit an easy and instantaneous plane of the topping means over a vertical range of adequate height which is amply sufficient to permit the topping of beets of any degree of irregularity as to height and depth. No trouble whatever is experienced in traveling to and from the field. The lever 28 raises and lowers the frame and by the same means and in the same manner the topping mechanism is also raised and lowered in the same degree and to the same extent, this for the reason the brackets 30 to which the bearings 31 are attached are clamped to the side bars 5 of the frame. The braces 43 are pivoted at their lower extremities to the slipper plows 34 and at their upper extremities to the side bars 5. They permit the topping mechanism moving upwardly and downwardly freely. The sole purpose of the braces 43 is to afford support for the deflectors 46, and because of the same manner of attachment a simultaneous movement in conjunction with the topper is permitted which assures a proper position at all times for the work of the deflectors. A cross bar 52 is disposed on the bars 5 immediately adjacent the bars 50 and pivotally supports the lever 28. Depending bars 54 on the side bars 5 have their lower ends braced as at 55 and have journaled in their lower ends a shaft 56. Uprights 57 rise from the rear ends of the frame bars 5. Sides 58 are supported between the upper ends of the uprights 57 and the lower ends of the bars 54. A shaft 60 is journaled through the upper ends of the uprights 57. The shaft 60 is operatively connected to the counter shaft 12 by chain 60'. Chain and sprocket mechanism 61 connect the shafts 56 and 60 and the chains thereof have disposed therebetween cross rods 62 which move along a bottom 63, provided between the sides 58 and displace dirt from said bottom. Thus an elevator is formed.

A receptacle is mounted at the rear of the frame and comprises a lower frame 65, and an upper frame 66, which are connected by an upright 67 and a rear wall 68, and also by a plurality of spaced parallel inverted V-shaped rods 69, the extremities of which are attached to the sides of the frames 65 and the apices of which extend over the longitudinal member 70 in the top frame 66, and preferably formed integrally with the bars 67. The frame 65 has forwardly disposed extensions 71, which are directed upwardly, intermediate their ends and attached to the rear portions of the frame bars 5, to hold the receptacles to the rear of the main frame. Plates 72 are hingedly mounted at their upper ends as at 73, to the sides of the frame 66, which extend downwardly. Cranks 74 extend sidewardly from the rear ends of shafts 75 journaled in brackets 76 on the sides of the frame 66 and the shafts at the forward ends are provided with other cranks 77. The cranks 74 are connected with intermediate portions of the plates 72 by rods 78. Springs 79 are engaged with the extremities of the cranks 74 and with the lower frame 65, and hold the plates 72, with their free lower edges in abutment with the sides of the frame 65, that is closed. A deflector 80 is hingedly mounted along the bar 70 as at 81, and may be swung to one side or the other for guiding the beets from the elevator to either side of the receptacle. Cables 82 are attached to levers 83 pivoted in a cross member 85, on the frame bars 5. These cables 82 extend rearwardly and are engaged with cranks 77, after being trained through sheaths 86, so that by swinging the lever 83 forwardly the side plates 72 may be swung outwardly to allow the beets to be dumped on the ground.

From the above detailed description it is thought that the construction, operation and advantages of the invention will be quite apparent to those skilled in this art. It will be seen that by adjusting the lever 28 the frame may be lowered so as to properly place the slipper plows and lifter or puller plows with respect to the ground, and then as the machine is pulled along by any suitable draft means, the slipper plow will cause the knife to be held in the proper position with relation to the beets so as to cut off the tops thereof. The tops which are thrown rearwardly will hit the deflector wing 46 to be urged to one side of the machine. The beets will then be lifted out of the ground by the plows 49 and by rods 51 delivered to the lower end of the elevator. The beets may be delivered by the elevator into either side of the receptacle and may be dumped from the receptacle in piles to both sides of the machine, when desired.

The present embodiment of the invention has been disclosed in detail, merely for the purposes of exemplification, since in actual practice it attains the features of advantage enumerated as desirable in the statement of the invention and the above description. It will be apparent that changes in the details of construction, and in the combination and arrangement of parts may be resorted to, without departing from the spirit or scope of the invention as hereinafter claimed or sacrificing any of its advantages.

Having thus described my invention, what I claim as new is:

1. A topping mechanism comprising a pair of slipper plows between which is suspended a horizontal cutter capable of severing a complete beet top and foliage in one operation, in combination with a rotatably mounted wheel disposed in a plane above that of the cutter and so relatively arranged with respect to the cutter that a space is afforded between the cutter and the wheel for the passage of the severed top and foliage, and tension springs whereby the same mechanism is automatically governed and regulated, permitting instantaneous accommodation to beets of different height and sizes.

2. In a machine of the kind described, a topping mechanism comprising a pair of slipper plows with a knife extending therebetween, a topper wheel rotatably mounted above the slipper plows, a pair of shanks rising therefrom, a frame, means for slidably receiving the shanks on the frame, and springs associated with the shanks for urging the same downwardly.

3. In a machine of the class described, a wheeled frame, means for adjusting the wheeled frame with respect to the ground, beet topping mechanism, pendent endwise movable shanks suspending said mechanism from the forward portion of the frame, and spring means associated with the shanks for urging the shanks rectilinearly downwardly and the mechanism toward the ground, said mechanism comprising a pair of slipper plows on the shanks with a knife bar extending therebetween, and a rotatable topper wheel mounted above the knife bar.

4. In a machine of the class described, a wheeled frame, means for adjusting the wheeled frame with respect to the ground, beet topping mechanism, pendent endwise movable shanks suspending said mechanism from the forward portion of the frame, and spring means associated with the shanks for urging the shanks rectilinearly downwardly and the mechanism toward the ground, said mechanism comprising a pair of slipper plows on the shanks with a knife bar extending therebetween, a rotatable topper wheel mounted above the knife bar, a wing mounted to the rear of the mechanism, and means for adjusting the wing as to its angularity to the travel of the machine for deflecting the beet tops to one side.

5. In a machine of the class described, a topping mechanism comprising a pair of slipper plows with a knife extending therebetween, a topper wheel rotatably mounted above the slipper plows, and a deflector adjustably mounted in the rear of the mechanism.

6. In a machine of the class described, a topping mechanism comprising a pair of slipper plows with a knife extending therebetween, a topper wheel rotatably mounted above the slipper plows, a frame, and a deflector adjustably mounted to the rear of the mechanism, said mechanism having a pair of shanks rising from the slipper plows, means for slidably receiving the shanks on the frame, and springs associated with the shanks for urging the same rectilinearly downwardly and the topping mechanism toward the ground.

7. In a machine of the class described, a wheeled frame, means for adjusting the wheeled frame with respect to the ground, beet topping mechanism suspended from the forward portion of the frame and having spring means associated therewith urging the mechanism toward the ground, said mechanism comprising a pair of shanks, a rotatable topper wheel mounted on a shaft journaled to the shanks, and a bar knife extending between the shanks and disposed in a plane below that of the topper wheel.

8. In a machine of the class described, a topping mechanism comprising a pair of shanks, means for slidably receiving the shanks on the frame, springs associated therewith for urging them downwardly, a knife bar extending therebetween, and a topper wheel rotatably mounted in a plane above the knife bar.

9. A topping mechanism comprising a frame, a pair of shanks, means for slidably receiving the shanks on the frame, a horizontal cutter extending between the lower extremities of said shanks and capable of severing a complete beet top and foliage in one operation, in combination with a rotatably mounted wheel disposed in a plane above that of the cutter and so relatively arranged with respect to the cutter that the said severing is effected without the assistance of extraneous means and a space is afforded between the cutter and wheel for the passage of the severed top and foliage, and tension springs whereby the said mechanism is automatically governed and regulated, permitting instantaneous accommodation to beets of different heights and sizes.

In testimony whereof I affix my signature.

JOHN W. BRIGHT.